UNITED STATES PATENT OFFICE.

WILLIAM M. B. KEEN AND WILLIAM F. HAARMANN, OF NEW YORK, N. Y., ASSIGNORS OF ONE-FOURTH TO EGBERT LE FEVRE, OF SAME PLACE.

MANUFACTURE OF CARBON FILAMENTS.

SPECIFICATION forming part of Letters Patent No. 445,374, dated January 27, 1891.

Application filed June 19, 1890. Serial No. 356,922. (No specimens.)

*To all whom it may concern:*

Be it known that we, WILLIAM M. B. KEEN, a citizen of the United States, and WILLIAM F. HAARMANN, a subject of the Emperor of Germany, residents of New York, county and State of New York, have invented certain new and useful Improvements in the Manufacture of Carbon Filaments for Incandescent Electric Lamps, of which the following is a specification.

Our invention relates to the manufacture of carbon filaments for incandescent electric lamps.

The object of the invention is the production of a filament strong, elastic, flexible, and endurable, and especially of very dense structure.

The principle underlying the invention is somewhat similar to that employed in the manufacture of beer.

The first step in the manufacture consists in mixing together in proper proportion the following-named substances or their equivalent: hops, glue or gum-arabic, saccharine matter, such as glucose, sugar, or honey, and water. The substances should be so mixed as to produce a viscous liquid slightly denser than ordinary molasses. To this end the proportion of water should be about twenty per cent., while the proportion for saccharine matter, hops, and glue are respectively thirty-five per cent., twenty per cent., and twenty-five per cent. The mixture is boiled for about one-half an hour for two purposes—namely, to form a more intimate mixture and to thicken the same to the desired degree, which is such that the mixture is in that condition which may be said to be half-way between liquid and solid. Ligatures of fiber, such as silk, cellulose in the form, for instance, of cotton, linen, grass, woody fiber, the skin of fruit, such as orange-peel, rhubarb, or, in fact, any carbonizable ligature of porous material, are allowed to remain in the liquid mixture for two or three hours, so as to become saturated with the same. In order that the saturation may be complete, it is considered preferable to put the ligatures in the liquid during the ebullition, because at that time the liquid is thinner than when it cools, and because the thickening of the liquid in the pores is an advantage. From the time that the mixture is made until the ligatures are carbonized internal reactions occur similar to those in the production of beer. By any convenient means the treated ligatures are dried and then carbonized by any well-known process. For instance, they may be wound upon carbon forms and heated gradually to an incandescent temperature out of contact with air. The carbons produced by this process are highly superior to those which would be obtained by carbonizing the ligatures without saturating them, as described.

We claim as our invention—

1. The hereinbefore-described process of manufacturing carbon filaments for incandescent electric lamps, consisting in saturating a ligature of vegetable or animal fiber, such as cellulose or silk, with a mixture of hops and a solution of saccharine matter and glue, concentrating said mixture by boiling, drying the saturated material, and carbonizing said ligatures.

2. The hereinbefore-described process of manufacturing carbon filaments for incandescent electric lamps, consisting in saturating a ligature of vegetable or animal fiber, such as cellulose or silk, with a saccharine and an aqueous solution of glue containing hops, heating and drying the saturated ligatures for the purpose described, and finally carbonizing said ligatures.

3. A carbon filament consisting of carbonized animal or vegetable porous ligatures saturated with a boiled aqueous solution of saccharine matter and glue containing hops.

4. A ligature from which to manufacture carbon filaments, consisting of the combination of animal or vegetable fiber saturated with a boiled aqueous solution containing hops.

In testimony that we claim the foregoing as our invention we have signed our names, in presence of two witnesses, this 7th day of June, 1890.

WILLIAM M. B. KEEN.
WILLIAM F. HAARMANN.

Witnesses:
EDWARD P. THOMPSON,
G. T. MIATT.